United States Patent [19]

Foster

[11] Patent Number: 5,824,205
[45] Date of Patent: Oct. 20, 1998

[54] PROTECTIVE COATING

[75] Inventor: John Foster, Avon, England

[73] Assignee: Praxair S.T. Technology, Inc., Danbury, Conn.

[21] Appl. No.: 619,723

[22] PCT Filed: Jul. 24, 1995

[86] PCT No.: PCT/GB95/01745

§ 371 Date: May 16, 1996

§ 102(e) Date: May 16, 1996

[87] PCT Pub. No.: WO96/03535

PCT Pub. Date: Feb. 8, 1996

[30] Foreign Application Priority Data

Jul. 22, 1994 [GB] United Kingdom .................. 9414859

[51] Int. Cl.$^6$ ............................. C25D 15/02; C23C 18/16
[52] U.S. Cl. ...................... 205/109; 205/184; 205/195; 205/228; 427/304; 427/305; 427/376.7; 427/405; 427/419.2; 427/437; 427/438
[58] Field of Search ...................................... 205/109, 184, 205/195, 228; 427/304, 305, 376.6, 376.7, 437, 438, 405, 419.2

[56] References Cited

U.S. PATENT DOCUMENTS

| | | | |
|---|---|---|---|
| 4,005,989 | 2/1977 | Preston | 29/194 |
| 4,598,016 | 7/1986 | Thoma et al. | 428/328 |
| 4,789,441 | 12/1988 | Foster et al. | 204/37.1 |
| 4,810,334 | 3/1989 | Honey et al. | 204/16 |
| 4,880,614 | 11/1989 | Strangman et al. | 428/623 |
| 4,895,625 | 1/1990 | Thoma et al. | 205/109 |
| 5,037,513 | 8/1991 | Foster | 204/16 |

Primary Examiner—Bruce F. Bell
Assistant Examiner—William T. Leader
Attorney, Agent, or Firm—Douglas E. Denninger

[57] ABSTRACT

A method producing a coating on a substrate by aluminizing, chromizing or siliconizing the substrate, and depositing on the coated substrate by electrolytic or electroless deposition a metal matrix $M_1$ from a bath containing particles of $CrAlM_2$ to co-deposit the particles with the matrix as $M_1CrAlM_2$, where $M_1$ is Ni, Co or Fe or two or all of these elements and $M_2$ is Y, Si, Ti, Hf, Ga, Nb, Mn, Pt, a rare earth element or two or more of these elements. Preferably, the method includes platinum aluminizing of the substrate. Heat treatments may be incorporated before and after deposition of the $M_1CrAlM_2$. The deposition of the $M_1CrAlM_2$ is carried out at a current density of less than 5 mA per square centimeter. Preferably, the deposition forms a $M_1CrAlM_2$ layer less than 50 microns thick, and occurs at a bath loading of less than 40 grams per liter of the particles. In a preferred embodiment, the particle size distribution in the plating bath is 25 percent between 15 and 12 microns, 45 percent between 12 and 10 microns and 30 percent less than 10 microns. The method is particularly useful for coating a gas turbine part.

10 Claims, 2 Drawing Sheets

PROTECTIVE COATING

This is a national stage application of PCT/GB95/01745 filed on Jul. 24, 1995.

The present invention relates to the provision of protective coatings, on substrates. Such coatings are employed on components which are subjected to high temperature environments, particularly where corrosion and/or erosion is likely to occur. The primary but not necessarily sole application of such coatings is to parts of gas turbine engines, particularly superalloy components thereof, such as gas turbine shafts, rings, disks, combustion can ware, stator and rotor blades and guide vanes. The invention also relates to such parts, and to machinery and vehicles or fixed installations which incorporate such parts.

It has long been recognised that components of gas turbines, particularly the internal components thereof in the vicinity of and downstream of the combustor, need to exhibit high strength and corrosion resistance at high temperature.

It is known to provide such components with a load bearing structure of superalloy material, to provide sufficient high temperature strength. Typical superalloys used (examples are those known under the trade designations IN100, IN718, IN738, MAR-M002, MAR-M247, CMSX-4, PWA1480 and PWA1484) are the Ni, Co and Fe base superalloys, dependent upon the particular application requirements. Fe and Co base superalloys are often solid solution strengthened. Ni base alloys have Ni as the major constituent and often contain amounts of Cr Co Fe Mo W or Ta, and are often solid solution or precipitation strengthened. Precipitation strengthened Ni base alloys are widely used for gas turbine components and often contain Al Ti or Nb to produce a precipitated second phase in the course of a suitable heat treatment. Examples of Ni base precipitation strengthened superalloys used for gas turbine components are those known under the trade designations INCO 713, B-1900, IN 100, MAR-M 200, and MAR-M 247. Examples of Co base superalloys are MAR-M 509 and Haynes 188, and examples of Fe base superalloys are Incoloy 802 and Incoloy 903. Superalloy gas turbine components are sometimes wrought or cast and, for the more extreme operating conditions, may be directionally solidified or in the form of single crystal structures.

It has become common practice to coat superalloy components with corrosion resistant material since the superalloy itself will not normally be capable of withstanding the corrosive/oxidative in-service atmosphere.

One practice is to aluminise the superalloy. This is usually accomplished using a so-called pack aluminising process, or by physical vapour deposition. These processes involve diffusion of Al into the superalloy to form aluminides such as NiAl in the case of Ni base superalloys. In service, a surface layer of $Al_2O_3$ forms to protect the material beneath and this tends to exfoliate due to thermal expansion and contraction. This is gradually repaired by outwardly diffusing Al and finally, when there is no longer sufficient Al to replace exfoliated material at a particular location, the superalloy component will be liable to rapid localised corrosion. Chromium and silicon either together or singly and alone or in addition to aluminium may likewise be diffused into the superalloys to form a surface layer including chromides or suicides. Although reference will be made hereafter mainly to aluminising it should be understood that such references should be interpreted as alternatively referring mutatismutandis to chromising and/or siliconising.

A further practice is to coat the superalloy with an overlay of, for example MCrAlY, MCrAlHf, MCrAlYHf, MCrAlYHfSi and MCrAlTaY where M is Co or Ni or Fe or a mixture thereof. The addition of Y Si or Hf helps to prevent exfoliation of $Al_2O_3$ from the surface and thus extends the life of the component. These overlay materials may be applied by plasma spraying; or by a co-deposition process, such as the process we describe in our patent GB-B-2 167 446. It is usual to coat a component with these materials to produce a layer 75 to 200 $\mu$m or more in thickness. The coating processes are expensive and coating components to this order of thickness gives them a life long enough to justify the cost. However, as loads on gas turbine components continue to increase, it is becoming increasingly more undesirable to coat components thereof such as rotor blades with what is effectively non-structural material.

A further problem with layers of this order of thickness is that they tend to be susceptible, as in-service conditions become gradually more extreme in more modern gas turbines, to thermal mechanical fatigue cracking and this is highly undesirable, particularly if the coating is applied to a thin-walled hollow superalloy component such as a turbine blade, since the cracking of the coating can cause blade failure.

U.S. Pat. No. 4,933,239 describes plasma spraying of a 0.001 inch (25.4 $\mu$m) overlay of CoCrAlYSiHf on to Ni base superalloy. After plasma deposition, the coating is glass bead peened, aluminised with a pack cementation mixture, and is, finally, put through diffusion and precipitation heat treatment steps. The specification indicates that the preferred method of applying the CoCrAlYSiHf coating is by plasma spraying, but the specification also makes a general statement that the overlay coating can be applied by, e.g., plasma spraying, electron beam evaporation, electroplating, sputtering, or slurry deposition. One reason for the peening operation in the prior art is thought to be that the as-deposited MCrAlY is not particularly smooth.

Furthermore, the morphology of the overlay is significantly altered by the aluminising process which appears intended to diffuse aluminium completely through the overlay and into the superalloy substrate.

Another problem is that it is difficult to ensure that the key elements Y, Si, and Hf, originally present in the overlay, are provided in a relatively large proportion conveniently close to the exterior surface of the finished product.

The present invention aims to alleviate the problems of the prior art.

According to a first aspect of the present invention there is provided a method of producing a coating on a substrate which comprises aluminising, chromising or siliconising the substrate, and depositing on the treated substrate by electrolytic or electroless deposition a metal matrix $M_1$ from a bath particles of $CrAlM_2$ so as to co-deposit the particles with the matrix, $M_1$ being Ni or Co or Fe or two or all of these elements and $M_2$ being Y, Si, Ti, Hf, Ta, Nb, Mn, Pt, a rare earth element or two or more of these elements.

One advantage of the present invention is that it does not incorporate, as an essential feature of the coating process, a peening step. Another advantage is that key elements, such as Y, Si and Hf may be conveniently close to the exterior surface of the finished product. A further advantage is that the $M_1CrAlM_2$ does not have to be subjected to further aluminising and a far superior morphology thereof is obtainable in the finished product.

The substrate may be aluminised according to one of many different aluminising process, such as processes comprising or including pack aluminising, physical vapour phase or flame spray aluminising, sputtering or electroplating. Preferably, the substrate is aluminised by a pack aluminising process. Similarly, chromising or siliconising can be achieved by equivalent processes.

In a preferred embodiment, the substrate is platinum aluminised. This may comprise depositing a layer of platinum, such as by electroplating, before or after aluminising. The platinum layer deposited may be about 5 or about 10 μm thick. Palladium or ruthenium could be used instead of or as well as platinum.

Before co-deposition of the $M_1CrAlM_2$, a heat treatment may be incorporated into the coating process.

In a particularly preferred embodiment, whether or not a heat treatment is incorporated before co-deposition of the $M_1CrAlM_2$, a heat treatment is carried out after co-deposition of the $M_1CrAlM_2$ so as to cause a desirable amount of homogenisation of and diffusion between the aluminising and $M_1CrAlM_2$ coatings. Preferably, the aluminising is by pack aluminising at approximately 900° C. for approximately 6 hours in a controlled atmosphere such as argon or helium. Thereafter, the component may be subjected to a post-diffusion treatment at approximately 1100° C. for approximately one hour in vacuum and the coating then aged at approximately 870° C. for approximately 16 hours in vacuum. Alternatively or in addition, the component may be subjected, after deposition of the $M_1CrAlM_2$ layer over the aluminised layer to a heat treatment at approximately 1050° C. for approximately 2 hours in vacuum.

We find that the $M_1CrAlM_2$ layer provides a particularly suitable bond coat for the subsequent application of a layer of thermal barrier material, such as zirconia which may be stabilised (e.g. lime or yttria stabilised). The thermal barrier material may be deposited in the form of a columnar material. Preferably the thermal barrier layer has a thickness greater than 25 μm and may have a thickness between 100 and 250 μm.

The thermal barrier is preferably applied by electron beam physical vapour deposition or plasma sprayed in air.

In this invention, we prefer a current density during $M_1CrAlM_2$ deposition of less than 5, more preferably less than 3, and yet more preferably less than 2.5 mA per square centimeter. A current density of about 2 mA per square centimeter is even more preferable in some circumstances, a current density of about 1 mA per square centimeter being one example.

At the relatively low current densities which may be employed in this invention, we note a tendency for the constitution of particles on the as deposited coating to differ from the constitution in the bath, in that smaller particles are preferentially deposited (e.g. using <15 μm powder, the >10 μm particles do not plate so preferentially as the <10 μm particles). This is particularly surprising since, in theory based upon Faraday's Law and Stokes' equation (see Transactions of the Institute of Metal Finishing, article entitled: "The Production of Multi-Component Alloy Coatings by Particle CoDeposition," by J. Foster et al, pp. 115–119, Vol. 63, No. 3–4, 1985) assuming suitable conditions of current density and agitation are used, the larger the particle size the smaller the bath loading needs to be to achieve a particular fraction of powder incorporated in the as-deposited coating. One would therefore expect larger particles to be preferentially plated, but we have found that at relatively low current densities, the opposite occurs.

In one embodiment, the $M_1$ comprises Co. This helps to promote a particularly smooth coating. If it is desirable for Ni to be present in the coating, a flash of Ni may be electroplated either on top of the co-deposited material, or directly onto the aluminide coating before the co-deposition step. The flash of Ni may be about 2 μm thick.

It is preferred for the metal matrix material and particles to be co-deposited to form a layer less than 50 or, more preferably, less than 25 μm thick. In a particularly preferred embodiment, the layer may be about 15 μm thick. However, the layer may be less than 15 microns thick, about 12 or 10 μm or less than these values being examples. For most applications, it is preferable for the layer to be more than or equal to 5 μm thick, more preferably still for it to be more than or equal to 10 μm thick. However, the layer may, for some applications, be more than 15 μm thick.

It is preferable for the co-deposition to be carried out at a bath loading of less than 40 g/l of the particles. More preferably, a bath loading of about 30 g/l, or less than 30 g/l, is used. More preferably still, a loading of about 20 g/l, or less than 20 g/l, is used. In a particularly preferred embodiment, a bath loading of about 10 g/l is used, although lower loadings, such as about 1 g/l, are envisaged. These relatively low bath loadings ensure that the deposited coating does not build up in a porous manner.

The particles may be spherical, and may be formed using an atomiser, such as a nozzle atomiser.

Preferably the particles in the bath comprise <15 μm<12 μm, or <10 μm powder.

In one preferred embodiment, the particle distribution in the bath consists of 25% between 15 and 12 μm, 45% between 12 and 10 μm, and 30% less than 10 μm. We have found, surprisingly and unexpectedly, that plating at relatively low current densities results in small particles being preferentially deposited; when powder with this in-bath distribution is used, a distribution in the as-deposited $M_1CrAlM_2$ coating (as a weight percentage of the amount of powder in the deposit) of 45%<10 μm, 55% between 10 and 12 microns, and 0% between 12 and 15 μm may result.

Excellent coatings are achievable with processes incorporating this refinement step and, preferably, a refinement step is included in the co-deposition step.

In an especially preferred embodiment, a layer of protective $M_1CrAlM_2$ material is deposited which comprises only a mono-layer or duo-layer of particles. For example, when <15 μm powder is suspended in the bath, due to the refinement, it is possible to put down, as desired, a substantially continuous 12 or 10 μm mono-layer of particles (the largest as-deposited particles being 12 or 10 μm in size respectively). In another preferred process, 4 to 8 μm powder may be used to provide a duo-layer or trio-layer substantially 10, 12, 15 or 20 microns thick, as desired.

Thus, we only need a relatively small or thin amount of $M_1CrAlM_2$ to provide useful elements such as Y, Si or Hf which assist in preventing exfoliation of $Al_2O_3$. This is highly desirable for components of gas turbines such as rotor blades since the total thickness, and therefore weight, of coating materials on a substrate (such as a rotor blade), may be reduced without reducing the level of corrosion protection. Hence the rotor blade is stronger relative to its weight and is capable of sustaining higher rotational or aerodynamic forces, resulting in increased gas turbine performance.

The aluminide layer may initially have a thickness of 30 to 60 μm (50 μm typical) and the $M_1CrAlM_2$ layer may initially have a thickness of 10 to 50 μm after heat treatment, the aluminide layer will have an inner diffusion zone with a lesser concentration of Al and a thickness of 10 to 20 μm and an outer zone with a higher concentration of Al and a thickness of 20 to 40 μm. The thickness of the $M_1CrAlM_2$ layer is substantially unaffected by heat treatment. Ratios of the thickness of the aluminide layer to that of the $M_1CrAlM_2$ layer is preferably between 4:1 (for example with a total thickness of 50 μm) and 1:1 (for example with a total thickness of 110 μm). The thickness referred to will all be increased where a thermal barrier layer is included; such a layer might have a thickness in the range 100 to 250 μm.

In one embodiment, the substrate onto which the aluminising material is applied comprises a superalloy which may comprise a component of a gas turbine.

The substrate may comprise any gas-washed substrate of a gas turbine component, such as the aerofoil, root or shroud portions of a blade.

After co-deposition, the co-deposited material may consist of more than 40% (by volume) of the particles, and in some applications, 45% may be exceeded.

During the co-deposition process, gas, such as air or an inert gas, may be admitted to the bath at a location to produce circulation in the solution generally upwards in one zone and generally downwards in a second zone, the substrate being located in the second zone during co-deposition. The substrate (or component of which it forms part) may be rotated about an axis which is horizontal or has a horizontal component during co-deposition. Electrodeposition apparatus as described in our patent GB-B-2182055 may be used.

In some circumstances, it may be desirable, during co-deposition, to rotate the substrate about a first axis having a horizontal component, and to rotate the substrate about a second axis which is non-parallel with the first. The cycle of rotation about the first axis may include periods of higher angular velocity and periods of lower angular velocity. The second axis may be perpendicular to and/or intersect the first axis. The cycle of rotation about the first axis may be alternately stop and go. When the substrate is only rotated about one axis having a horizontal component, the rotational cycle may include periods of higher angular velocity and periods of lower angular velocity, and rotation may also be alternately stop and go. Manipulation of the substrate may be in accordance with the process described in our patent GB-B-2221921.

According to a second aspect of the present invention there is provided a method of manufacturing or overhauling a gas turbine component which includes coating a substrate of the component according to the first aspect of the invention.

According to a third aspect of the present invention there is provided a gas turbine component or a gas turbine including a component manufactured or overhauled according to the second aspect of the invention.

According to a fourth aspect of the present invention there is provided a vehicle or a fixed installation including a gas turbine according to the third aspect of the invention. A vehicle according to this aspect of the invention may comprise, for example, an aircraft, or a water or land vehicle.

BRIEF DESCRIPTION OF THE DRAWINGS

The invention may be performed in various ways but one method of coating will now be described by way of example with reference to the accompanying diagrammatic drawings, in which.

Figure 1:
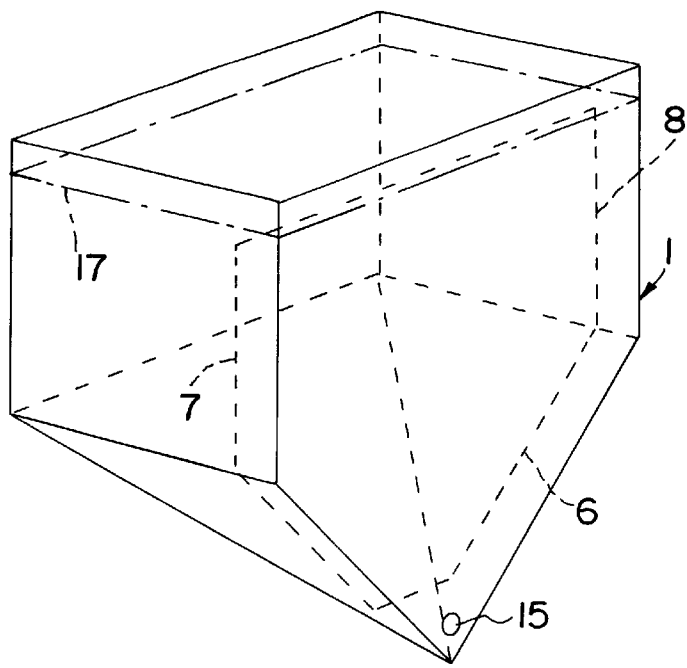
FIG. 1 is a perspective view of a coating apparatus.

A series of gas turbine blades (42) of superalloy material are to be coated with protective material in a process which involves the deposition thereon of two or three layers of material. The blades are first pack aluminised and are subsequently coated using the co-deposition apparatus shown in the drawings. As an optional third step, a layer of thermal barrier material is subsequently deposited.

The apparatus shown in the drawings, comprises a vessel or container 1 having a parallelepiped shaped upper portion 2 and a downwardly tapering lower portion 3 in the form of an inverted pyramid which is skewed so that one side face 4 forms a continuation of one side face 5 of the upper portion.

The vessel 1 contains a partition 6 which lies in a vertical plane parallel to the side faces 4 and 5 of the vessel and makes contact at its side edges 7 and 8 with the adjacent vertical and sloping faces of the vessel. The partition thus divides the vessel into a larger working zone 9 and a smaller return zone 11. At its bottom, the partition 6 terminates at a horizontal edge 12 above the bottom of the vessel to afford an interconnection 13 between the working zone 9 and the return zone 11. At its top, the partition 6 terminates at a horizontal edge 14 below the top edges of the vessel 1.

At the bottom of the return zone 11 there is an air inlet 15 which is connected to an air pump (not shown). Mounted in the working zone 9 is a jig 21 to which the workpieces to be coated are mounted, the jig 21 being arranged to move the workpieces within the vessel in a manner to be described in greater detail below.

When the apparatus is to be used for electrolytic plating, conductors are provided to apply a voltage to the workpiece mounted on the jig 21 relative to an anode which is suspended in the working zone.

To use the apparatus, to co-deposit a coating on the workpieces, the workpieces are mounted on the jig 21 which is positioned in the vessel as shown. Before or after the positioning of the jig, the vessel is filled to a level 17 above the top edge 14 of the partition 6 with a plating solution containing particles to be co-deposited. Air is admitted to the inlet 15 and this rises up the return zone 11, raising solution and entrained particles. At the top of the return zone, the air escapes and the solution and particles flow over the broad crested weir formed by the top edge 14 of the partition and flow down past the workpieces on the jig 21. At the bottom of the working zone 9, the particles tend to settle and slide down the inclined sides of the vessel towards the interconnection 13 where they are again entrained in the solution and carried round again.

As the downwardly travelling particles in the working zone 9 encounter the workpiece, they tend to settle on the workpiece where they become embedded in the metal which is being simultaneously plated out.

Figure 2:
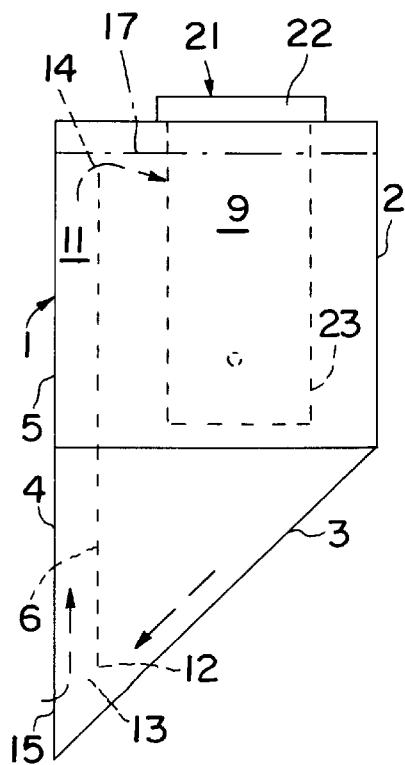
FIG. 2 is a side elevation of the apparatus.
Figure 3:
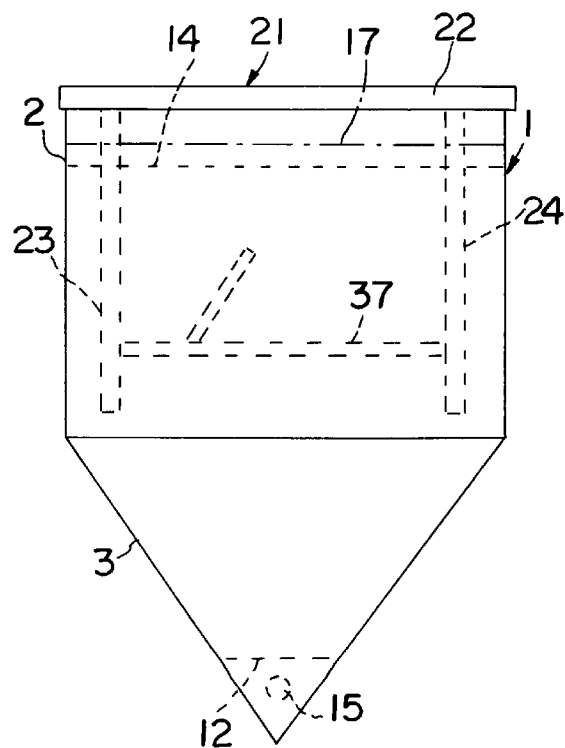
FIG. 3 is a front elevation of the apparatus.
Figure 4:
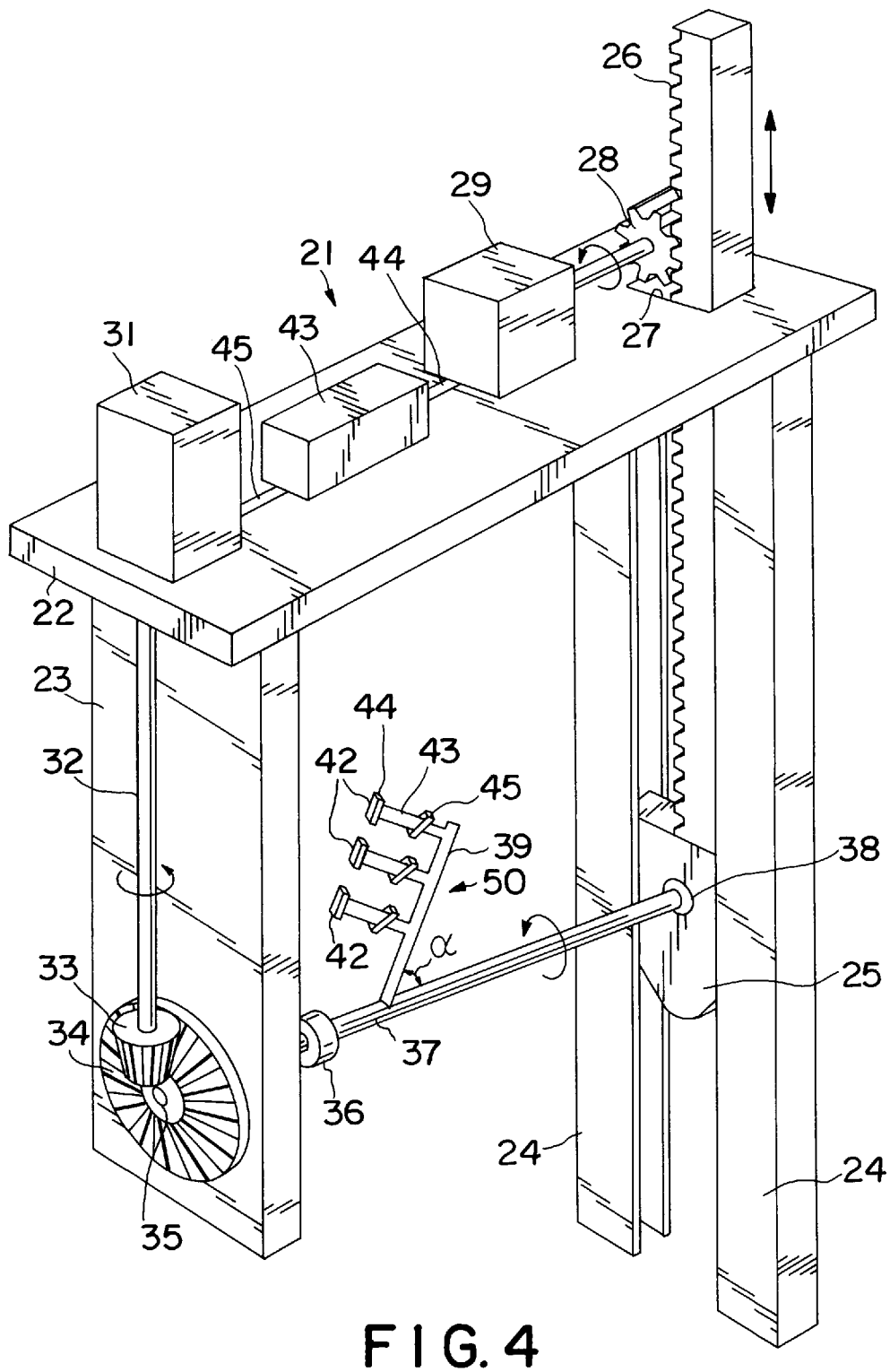
FIG. 4 is a perspective view of a jig on which the articles to be plated are suspended.

As shown in FIG. 4 and as described in GB-B-2 254 338, the workpieces to be coated are mounted on a jig 21 which is suspended in the vessel 1. The jig is shown in simplified form in FIGS. 2 and 3 but omitted from FIG. 1 for reasons of clarity. The jig 21 comprises a deck 22 which fits over the top of the vessel 1, a depending pillar 23 towards one end and a pair of depending guides 24 at the other end. The guides 24 have facing guideways in which slides a crosshead 25 carrying a vertical rack 26 which passes upwards through a hole 27 in the deck 22 and meshes with a pinion 28 driven by a reversible electric motor 29. The deck 22 supports a second electric motor 31 which drives a vertical shaft 32 carrying a bevel pinion 33 which engages a crownwheel 34 fixed to one end of a spindle 35 mounted in the pillar 23. The other end of the spindle 35 is connected by a universal joint 36 to one end of a shaft 37 the other end of which is carried by a spherical bearing 38 in the cross-head 25.

The shaft 37 carries a plurality of spurs which are rigidly attached thereto, only one spur 39 being shown in FIG. 4. The spur 39 extends in a plane containing the axis of the shaft 37 with the longitudinal axis of the spur making an angle α with the axis of the shaft 37. Mounted on the spur 39 and spaced therealong are three gas turbine blades 42 to be coated, with the longitudinal axes of the blades extending in the said plane and perpendicular to the longitudinal axis of the spur 39 so that the longitudinal axes of the blades make angles of (90−α)° to the axis of the shaft 37.

An electronic motor controller 43 is mounted on the deck 22 and is connected by lines 44 and 45 to the motors 29 and 31. The controller 43 is designed to drive the motor 31 in one direction only but with a stop so as to rotate the shaft 37 about a nominally horizontal axis (the x-axis). The controller 43 is designed to drive the motor 29 alternately in opposite directions to reciprocate the cross-head 25 and so superimpose on the rotation about the x-axis an oscillatory rotation about a rotating axis in the universal joint 36 (the y-axis).

The angle α and the parameters of the cycles executed by the motors 29 and 31 are selected to suit the workpiece being coated so as to ensure that all surfaces to be coated spend sufficient time facing generally upwardly to receive an adequate loading of descending particles to be incorporated in the plated metal as it is deposited. One particular example of a coating and the method of production thereof will now be described by way of example.

EXAMPLE

The coating is to be produced on a gas turbine blade 42 having an aerofoil section 43 with a root portion 44 at one end and a shroud portion 45 at the other end, the platforms of the root and shroud both extending at angles of approximately 70° to the axis of the aerofoil portion and the root portion and the shroud portion having end faces which extend at respectively 30° and 40° to the circumference of the ring of which the blade forms part. For blades of this geometry the angle α is 70°.

It is intended to produce on the aerofoil and platform portions of the blade an aluminising coating followed by a coating containing 18.32 weight percent Cr, 8.25 weight percent Al, 0.457 weight percent Y and the remainder cobalt. To produce the latter coating the bath is filled with a cobalt plating solution comprising 400 grams per liter of $CoSO_4.7H_2O$, 15 grams per liter of NaCl and 20 grams per liter of boric acid $H_3BO_3$. The bath is maintained at a pH of 4.5 and a temperature of 45° C. The bath is loaded with powder to a concentration of 10 grams per liter, the powder having a size distribution of 5 to 15 micrometers and being composed of 67.8 weight percent chromium, 30.1 weight percent aluminium and 1.7 weight percent yttrium.

First, the aerofoil and platform portions of the blade are aluminised by a pack aluminising process at 900° C. for 6 hours in argon. The aluminide layer is then post-diffused for 1 hour at 1100° C. in vacuum and aged for 16 hours at 870° C. in vacuum.

Prior to coating with the CoCrAlY material the parts of the root and shroud portions which are not be plated are given a wax mask and the remaining surfaces are given the conventional preparation treatments appropriate to cobalt plating.

The blade is fixed to a jig 50 with its axis (see FIG. 4) at 20° to the x axis of the jig which is horizontal. During plating the x axis of the jig is oscillated plus and minus 25° about the y axis which is perpendicular to the x axis with a cycle time of 3 minutes. Simultaneously, the jig is rotated about the x axis unidirectionally and through 360° with a cycle time of 10 minutes for a complete revolution. However the rotation about the x axis is intermittent with 10 second stop periods being interspersed with 3 second go periods.

Plating is carried out with a current density of 1.5 amps per square centimeter for a period sufficient to produce a coating thickness of substantially 12 μm.

A coating of excellent qualities is produced covering the aerofoil portion and the root and shroud platforms and having a weight fraction of incorporated powder of 0.27.

The smaller particles are plated preferentially and substantially none of the as-deposited particles are >12 μm in size, the larger particles remaining in the plating solution (ie those between 12 and 15 μm). After removal of the coated blades from the jig, the masking is removed.

The blade is then heat treated at 1050° C. for 2 hours in vacuum.

Particularly preferred $M_2$ elements are Y, Hf, and Si.

Coatings produced in accordance with the invention have good oxidation resistance and thermal fatigue resistance.

I claim:

1. A method of producing a coating on a substrate which comprises first aluminising, chromising or siliconising said substrate, then depositing on said substrate, by electrolytic or electroless deposition, a metal matrix $M_1$ from a bath containing particles of $CrAlM_2$, said bath having a particle distribution of 25 percent between 15 and 12 microns, 45 percent between 12 and 10 microns and 30 percent of less than 10 microns, to co-deposit the particles with the matrix as $M_1CrAlM_2$, wherein $M_1$ is at least one element selected from the group consisting of Ni, Co, and Fe and $M_2$ is at least one element selected from the group consisting of Y, Si, Ti, Hf, Ta, Nb, Mn, Pt and rare earth elements, wherein said co-deposition of $M_1CrAlM_2$ is at a current density of less than 5 mA per square centimeter and forms a layer less than 50 microns thick.

2. The method of claim 1 which further includes a heat treatment either before or after co-deposition of the $M_1CrAlM_2$, wherein if said heat treatment occurs before said co-deposition, said treatment comprises subjecting said aluminised, chromised or siliconised substrate to between 1000° C. and 1100° C. for approximately one hour under vacuum, and wherein if said heat treatment occurs after said co-deposition, said treatment comprises subjecting the co-deposited $M_1CrAlM_2$ to about 1100° C. for approximately one hour under vacuum conditions.

3. The method of claim 2 wherein said aluminising, chromising or siliconising forms an aluminide, chromide or silicide layer which, after said heat treatment, comprises an inner diffusion zone with a comparatively lesser concentration of Al, Cr or Si and a thickness of 10 to 20 μm and an outer zone with a comparatively higher concentration of Al, Cr or Si and a thickness of 20 to 40 μm.

4. The method of claim 1 which, subsequent to deposition of the $M_1CrAlM_2$, further includes the application of a layer of thermal barrier material.

5. The method of claim 1 wherein said co-deposition of metal matrix material and particles is carried out at a bath loading of less than 40 g/l of the particles.

6. The method of claim 1 wherein said aluminising, chromising or siliconising forms an aluminide, chromide or silicide layer respectively, having a thickness of 30 to 60 μm.

7. The method of claim 1 wherein said aluminising, chromising or siliconising forms a first layer of an aluminide, chromide or silicide and said co-deposition forms a second layer of $M_1CrAlM_2$, wherein the ratio of the thicknesses of the first layer to the second layer is between 4:1 and 1:1.

8. The method of claim 1 wherein the substrate is a turbine part selected from the group consisting of an aerofoil, root, shroud, turbine shaft, ring, disc, combustion can ware, stator blade, rotor blade and guide vane.

9. The method of claim 1 wherein said co-deposition of the metal matrix material and particles forms a layer less than 25 microns thick.

10. A method of producing a coating on a substrate which comprises first aluminising, chromising or siliconising said substrate, then depositing on said substrate, by electrolytic or electroless deposition, a metal matrix $M_1$ from a bath containing particles of $CrAlM_2$ to co-deposit the particles with the matrix, wherein $M_1$ is at least one element selected from the group consisting of Ni, Co, and Fe and $M_2$ is at least one element selected from the group consisting of Y, Si, Ti, Hf, Ta, Nb, Mn, Pt and rare earth elements and wherein said co-deposition of $M_1CrAlM_2$ is at a current density of less than 5 mA per square centimeter, wherein said co-deposition of $M_1CrAlM_2$ is carried out at a bath loading of less than 40 g/l of the particles and wherein said bath has a particle distribution of 25 percent between 15 and 12 microns, 45 percent between 12 and 10 microns and 30 percent of less than 10 microns.

* * * * *